Sept. 4, 1956     S. G. HENDRIX ET AL     2,761,520
SAFETY CONTROL FOR VARIABLE PITCH PROPELLER
Filed April 7, 1953
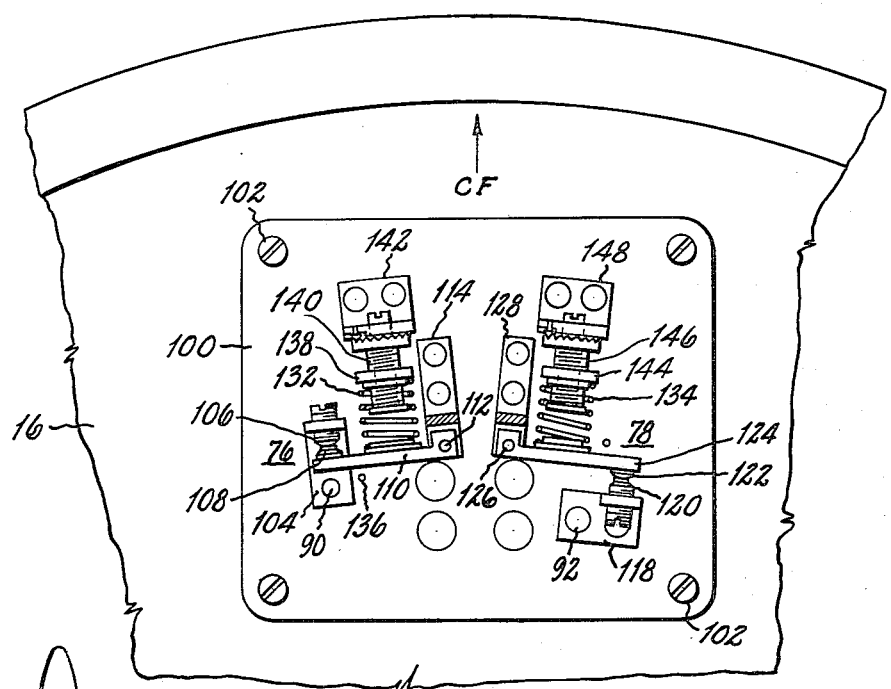
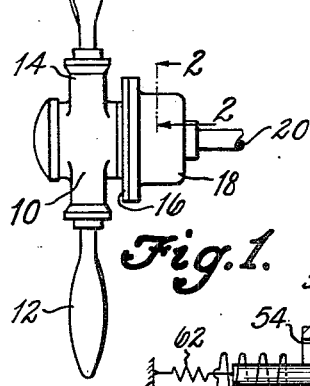
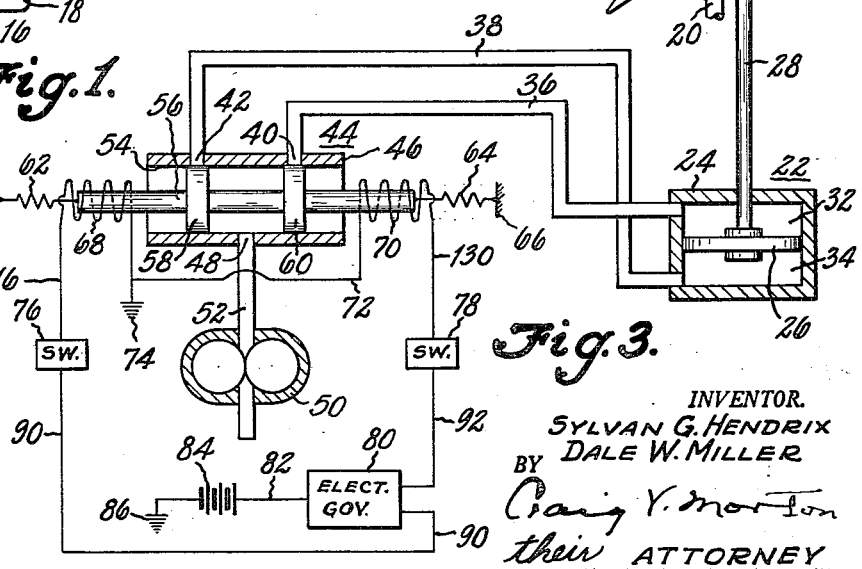
INVENTOR.
SYLVAN G. HENDRIX
DALE W. MILLER
BY
*Craig V. Morton*
*their* ATTORNEY United States Patent Office 2,761,520
Patented Sept. 4, 1956

2,761,520

SAFETY CONTROL FOR VARIABLE PITCH PROPELLER

Sylvan G. Hendrix, Troy, and Dale W. Miller, Brookville, Ohio, assignors to General Motors Corporation, Detroit, Mich., a corporation of Delaware Application April 7, 1953, Serial No. 347,252

17 Claims. (Cl. 170—160.21)

This invention relates to the control of servomotor operation suitable for use in a controllable pitch propeller, such as disclosed in copending application Serial No. 276,372, filed March 13, 1952, in the name of Moore et al., and has for an object, to provide safety measures against the failure of a speed control governor or other control apparatus.

An important object of the invention is to provide safety control for a proportionating control device which applies a series of alternating or opposing impulses for maintenance of static conditions, and which impulses are differentially altered for effecting predetermined operation of the servomotor, it being possible to eliminate the shorter of the impulses at a point where the differentiation reaches a predetermined value.

The foregoing is accomplished by inserting in each of the control paths a supplementary control device, such as a centrifugally controlled switch that are each operable to interrupt the respective control path at predetermined operating conditions of the servomotor.

Further objects and advantages of the present invention will be apparent from the following description, reference being had to the accompanying drawings wherein a preferred embodiment of the present invention is clearly shown.

In the drawings:

Fig. 1 is a view of a propeller mechanism embodying the instant invention.

Fig. 2 is a structural view of a control device used in the structure of Fig. 1, the view being somewhat as indicated by the lines and arrows 2—2.

Fig. 3 is a schematic view of a propeller mechanism and its control embodying the structural elements of Fig. 2.

Referring to Fig. 1 of the drawings, 10 indicates a controllable pitch propeller hub having a plurality of blades 12 rotatable upon their axes in sockets 14 for pitch change movement under control of an hydraulic regulator comprised by regulator plate 16 enclosed by a cover 18 spbstantially as shown and claimed in the U. S. Patents 2,307,101 and 2,307,102. The propeller is to be driven by a prime mover through a shaft 20 supporting the hub 10.

Referring to Fig. 3, any pitch change of the blades 12 is effected by a reversible servomotor 22 having a fluid pressure cylinder 24 traversed by a piston 26 which has a rod 28 engaging a blade gear 30 for rotating the blade 12 in either direction, while the propeller is rotated by the shaft 20. Operation of the servomotor 22 is effected by exchange of fluid pressure between a pitch decrease chamber 32 and a pitch increase chamber 34, through fluid passages 36 and 38 respectively connected at ports 40 and 42 respectively of a reciprocating control valve 44. The ports 40 and 42 are provided by a sleeve 46 having a source port 48 connected with a pump 50 through a pipe 52. The bore 54 of the sleeve 46 is traversed by a plunger 56 having lands 58 and 60 cooperating with the control ports 40 and 42. In normal or rest conditions, the plunger 56 is centered so that the control ports 40, 42 are normally closed under the opposing forces of springs 62, 64 anchored to the plunger 56 and support 66.

Means for actuating or reciprocating the valve plunger include solenoid windings 68 and 70 connected by wire 72 to ground at 74, with the opposite ends of the solenoid connecting with switches 76 and 78 respectively and thence with an electric governor 80 connected by 82 with a current source 84 having a ground connection at 86. The details of switches 76, 78 and their mounting is shown in Fig. 2.

Under the assumption that switches 76, 78 are closed during normal operation of the propeller, the electric governor 80 produces a series of impulses that are alternately impressed upon the control paths 90, 92 leading from the electric governor 80 to the solenoid windings 68 and 70 and thence to ground. The electric governor 80 is of such characteristics that the impulses impressed upon control paths 90, 92 are equal during static or no change conditions of the reversible servomotor 22, but when effecting a change or motion or operation of the servomotor, the impulses applied to the control paths are differentially altered. That is to say, if the servomotor 22 is to be operated in either direction then the pulses applied to the control paths are longer in one path than in the other path, and the differentiation of the opposing impulses increases as the desired servomotor operation increases.

Under those conditions the valve plunger 56 will be reciprocated so as to permit fluid flow from the source port 48 alternately through the control ports 40 and 42. The flows will be equal under static conditions of servomotor operation, and will be unequal for effecting operation of the servomotor. The greater flow through control port 40, or 42 will be determined by the longer impulse applied to the respective solenoid. If the longer or larger impulse is applied to the control path 90 then the solenoid winding 68 will be energized for a longer time than the solenoid winding 70, and the control port 42 will be open to source port 48 longer than the port 40 will be open. The result is, there will be a greater flow or force application to the pitch increase chamber 34 resulting in motion of the piston 26 to rotate the blade 12 in a pitch increase direction.

The impulses produced by the governor and impressed upon the control paths may be in the ratio of 50:50 for the equilibrium or static condition of the servo-motor, in which case no resultant movement of the servo-motor piston occurs because the opposed forces are equal. If impulses of different or unequal characteristics are applied to the control paths, then there will be a resultant movement of the piston. If the impulses are changed differentially they then may be in the ratio of 60:40 and so on until the ratio passes through 99:1 to become 100:0, which amounts to continuous impression on one of the control paths. The ratio of impulse applied to the control paths is indicative of the forces applied to opposite sides of the servo-motor piston. It is the purpose of the governor 80, when set for constant speed operation of the propeller mechanism shown in Fig. 3, to maintain the impulse ratio at 50:50 and to correct any speed change by properly applying unequal impulses to the control paths. When the ratio is large, or when the differentiation approaches the maximum, the oposition offered by the smaller impulse amounts to very little, but yet may be more than what the governor can overcome under specified conditions.

Malfunctioning of the governor 80 is overcome by the switches 76 and 78 inserted in the control paths 90 and 92. Switch 76 may be termed an underspeed switch since it is connected into the control path 90 which is on the increase pitch side of the control valve 44. The switch 78 may be termed an overspeed switch since it is connected into the decrease pitch control path. During propeller operation both switches 76 and 78 are closed so that the control paths between the governor 80 and the solenoids for operating the valve plunger 56 are both closed. If an overspeed should occur the governor 80 attempting to correct that, applies a long impulse to the control path 90 and a short impulse to the control path 92. The longer impulse dominates and effects an increase pitch shift. If that is insufficient and if the speed still increases the switch 78 opens which eliminates the opposing short pulse in the control path 92. Then the full force and effect of the longer pulse is applied to the control valve 44 and the piston of the servomotor moves without opposition by the short impulse that would have been applied over the control path 92. In the instance of an under-speed the governor 80 attempts to correct by applying a longer impulse to the path 92 and a short impulse to the control path 90. That makes for a decrease pitch movement and an accompanying increase in propeller speed. If the speed correction is insufficient or not fast enough, then the switch 76 will open and thereby cut out the opposing short or small impulse.

As shown in Fig. 2 both switches 76 and 78 are mounted on a nonconducting base 100 which is mounted on the regulator plate 16 by screws or the like 102 and both therefore rotate with the propeller. On the base 100 a contact bracket 104 carries an adjustable contact 106 and is connected with the control path 90. The contact 106 is engageable by movable contact 108 carried by an arm 110 pivoted at 112 to a bracket 114 also mounted on the block 100 and connected by a wire 116 to a solenoid winding 68. The switch 78 has a contact bracket 118 secured to the base 100 for connection into the control path 92 and providing a fixed contact 120. Normally engaging contact 120 there is a movable contact 122 carried by an arm 124 hinged at 126 to a bracket 128 secured on the base 100 and connected to the solenoid winding 70 by wire 130. Both of the switches 76 and 78 are so mounted that the arms 110 and 124 respond to centrifugal force against the adjusted force of the springs 132 and 134.

Normally, that is when the propeller is not rotating and when centrifugal force is not effective, arm 110 will engage a back stop 136 while switch arm 124 will engage contact 120. Spring 132 is supported by an adjustable seat 138 threaded upon a stud 140 which is adjustable with respect to a bracket 142 also carried by the base 100. Spring 134 is supported similarly by the elements 144, 146 and 148. The tension of the springs 132 and 134 is therefore adjustable to mark the limits of a speed range within which the governor 80 is operative. As an example, switch 76 may be adjusted so that it will close in response to centrifugal force when the propeller rotation amounts to 13,900 R. P. M. A maximum speed limit setting for switch 78 might be 14,700 R. P. M. giving a range of 800 R. P. M. between the high and low limits of the governed speed range. That makes for the fact that both control paths 90 and 92 will be completed between the electric governor and the solenoid winding whenever the propeller rotation is somewhere between 13,900 R. P. M. and 14,700 R. P. M..

Those settings of the switches 76 and 78 will also coincide with a predetermined differential of impulses applied to the control paths to the extent that they may be calibrated to interrupt their respective control path when the impulse differentiation amounts to an 80:20 ratio. Under those conditions, when the ratio of impulse applications reaches a ratio of 80:20, the opposition provided by the lesser of the unequal impulse is eliminated. Following that, the valve plunger 56 then moves from a neutral position to one side only thereof. Now instead of applying impulses to the control paths in the ratio of 80:20 the application will be in the nature of 80:0. That is the full force of the longer pulse will be applied to one of the control paths with no impulse applied to the other path. The switches 76 and 78 therefor provide safety devices and operate as under-speed and over-speed governors.

While the embodiment of the present invention as herein disclosed, constitutes a preferred form, it is to be understood that other forms might be adopted.

What is claimed is as follows:

1. Control mechanism for a propeller having blades rotatable about their longitudinal axes to effect a pitch change, comprising in combination, a reversible fluid pressure motor operable to change the pitch of the blades, a fluid pressure system for operating the fluid pressure motor, a control valve for applying fluid under pressure to the motor to effect either an increase or a decrease pitch change, an electric governor for actuating the control valve, and overspeed and underspeed safety means associated with the governor and responding to centrifugal force for modifying the control of said valve when the propeller speed approaches the overspeed and underspeed limits of control to be effected by said governor.

2. In a variable pitch propeller having blades rotatable about their longitudinal axes to effect a pitch change, a reversible fluid pressure mechanism for changing the pitch of the blades and including a reversely operable control valve, a governor mechanism having means for reversely operating said control valve, and underspeed and overspeed speed control means for interrupting control to one side of said reversible control valve to prevent over adjustment of the blade pitch as the propeller approaches a predetermined under-speed and for interrupting control to the other side of said reversible control valve to prevent over adjustment of the blade pitch as the propeller approaches a predetermined over-speed.

3. Control mechanism for a propeller having blades rotatable about their longitudinal axes to effect a pitch change, comprising in combination, a reversible fluid pressure motor operable to change the pitch of the blades, a fluid pressure system for operating the fluid pressure motor, a control valve for applying fluid under pressure to the motor to effect either an increase or a decrease pitch change, a governor mechanism for actuating the control valve to effect constant speed operation of said propeller, and overspeed and underspeed safety means in said governor control for modifying said valve actuation when the propeller speed approaches the overspeed and underspeed limits of said governor.

4. Control mechanism for a propeller having blades rotatable about their longitudinal axes to effect a pitch change, comprising in combination, a reversible fluid pressure motor operable to change the pitch of the blades, a fluid pressure system for operating the fluid pressure motor, a control valve for applying fluid under pressure to the motor to effect either an increase or a decrease pitch change, an electric governor for actuating said control valve to effect selected constant speed operation of said propeller, a first control line extending from said governor to the control valve which when energized effects movement of said control valve to produce an increase pitch movement of said reversible fluid pressure motor, a second control line extending from said governor to the control valve which when energized effects movement of said control valve to produce a decrease pitch movement of said reversible fluid pressure motor, and switch means in both of said control lines operable to interrupt the respective control line for augmenting blade pitch control by the other control line, when the propeller speed increases above a selected high-speed limit or decreases below a selected low-speed limit.

5. Control mechanism for a propeller having blades rotatable about their longitudinal axes to effect a pitch change, comprising in combination, a reversible fluid pressure motor operable to change the pitch of the blades, a fluid pressure system for operating the fluid pressure motor, a control valve for applying fluid under pressure to the motor to effect either an increase or a decrease pitch change, solenoid means alternately operable upon said control valve for alternate application of fluid under pressure to opposite sides of said reversible motor, a governor for alternately energizing said solenoid means effecting application of equal and opposite control forces on said solenoid means for arresting motion of the reversible motor during selected constant speed operation of the propeller mechanism, effecting application of differentially altering control forces on said solenoid means for actuating said motor as the propeller speed increases or decreases, and centrifugally actuated means operable to interrupt energization of one of said solenoid means whenever propeller speed increases above a selected high-speed limit or decreases below a selected low-speed limit.

6. Control mechanism for a propeller having blades rotatable about their longitudinal axes to effect a pitch change, comprising in combination, a reversible fluid pressure motor operable to change the pitch of the blades in an increase pitch direction and in a decrease pitch direction, a fluid pressure system for operating the fluid pressure motor in one direction or the other, an electrically operated valve normally biased to port closed position but operable upon movement to either side of said port closed position to direct fluid under pressure to one side of the motor and away from the other side thereof, to effect movement of the blades in either direction, an electric governor for operating said valve and having means for producing, alternately, electrical impulses equal during onspeed conditions and unequal during off-speed conditions, said governor differentially energizing said electrically operated valve in effecting a pitch change movement of said reversible motor, and propeller speed responsive means operable to interrupt the shorter impulse producing means when propeller speed approaches the overspeed and underspeed limits of said governor.

7. Control mechanism for a propeller having blades rotatable about their longitudinal axes to effect a pitch change, comprising in combination, a reversible fluid pressure motor operable to change the pitch of the blades in an increase pitch direction and in a decrease pitch direction, a fluid pressure system for operating the fluid pressure motor in one direction or the other, an electrically operated valve normally biased to port closed position but operable upon movement to either side of port closed position to direct fluid under pressure to one side of the motor and away from the other side, means for moving said valve alternately in opposite directions away from said port closed position, an electrical governor for controlling said valve moving means and having means for producing alternately occurring opposed impulses in said valve moving means, which opposing impulses are equal when no change is to be made in blade pitch and are unequal for effecting blade movement in either direction, said electrical impulses increasing for the side of said valve movement effecting pitch change coincident with decreasing for the other side of said valve movement, and switch means included in each of said valve moving means for interrupting the respective impulse producing means when propeller speed exceeds the overspeed and underspeed limits of said governor.

8. The combination set forth in claim 7 wherein the switch means includes a centrifugally operated switch on the pitch increase side of said valve control for accelerating blade pitch change on the decrease pitch side of said valve.

9. The combination set forth in claim 7 wherein the switch means includes a centrifugally operated switch on the decrease pitch side of said operating means that interrupts the valve operating means on the decrease pitch side of said reversible motor.

10. In a controllable pitch propeller having power means for reversely changing the pitch of propeller blades and a reciprocating valve for distributing the power means, the combination of electrical actuating and governing means for effecting movement of the valve to effect either an increase pitch or a decrease pitch movement of the propeller blade, means providing an increase pitch control and a decrease pitch control path connecting the electric governor and said power distributing means, and means in each of said paths operable in response to predetermined propeller speed to interrupt the respective path at either end of a range of speed control.

11. In a controllable pitch propeller having power means for changing the pitch of propeller blades and a reciprocating valve for distributing the power means, the combination of electrical actuating means for reciprocating said valve, means providing an increased pitch control path and a decrease pitch control path connecting with said valve actuating means, governing means for controlling the reciprocation of said valve by applying impulses alternately to said pitch control paths, which impulses are equal and oppositely effective when no blade pitch change is to be made, and an unequal and oppositely effective when either an increase or decrease pitch change in blade movement is to be made, and means in each pitch control path responsive to predetermined propeller speed for opening the respective path when the propeller speed approaches the limits of said governor.

12. The combination set forth in claim 11 wherein the means in the decrease pitch control path includes a normally closed centrifugally operated switch that opens at a predetermined propeller speed to interrupt the decrease pitch control path for said valve and for marking the high speed limit of said governor.

13. The combination set forth in claim 11 wherein the means in the increase pitch control path includes a normally closed centrifugally operated switch that opens at a predetermined propeller speed to mark the low speed limit of the speed range of said governor.

14. In a control system for a reversible servo motor by application of impulses alternately to a pair of control paths, and which impulses are equal and opposite for static conditions of the servo motor and are differentially unequal for movement of said servo motor, said servo motor controlling the speed of a rotating element, the combination of means differentially altering impulses applied to said control paths for effecting forward or reverse movement of said servo motor, and means in each of said control paths for interrupting control over that path when the speed of said element increases above a high-speed limit or decreases below a low-speed limit.

15. In a control system for a reversible servomotor held in static condition by equal impulses applied alternately to each of a pair of control paths, and activated by unequal impulses applied alternately to each of said control paths, said servomotor controlling the speed of a rotating element, the combination comprising, means in each control path each responding to a different condition of servomotor operation to interrupt the respective control path when the speed of said element increases above a high-speed limit or decreases below a low-speed limit.

16. In a control system having a speed controlling reversible servomotor operated by the differentials of oppositely applied forces, the combination comprising, means for applying equal and opposing forces to both sides of said servomotor for on-speed conditions, and for applying unequal and opposing forces to both sides of said servomotor for accomplishing a speed correction of over-speed or under-speed, and means responding to centrifugal force for eliminating the small opposed force on the servomotor when the inequality of unequal forces reaches a predetermined differential value.

17. The combination set forth in claim 16 wherein the means responsive to centrifugal force includes a pivoted switch arm normally disengaging a fixed contact at a selected low speed limit for guarding the apparatus against under-speed.

References Cited in the file of this patent

UNITED STATES PATENTS

| | | |
|---|---|---|
| 2,229,058 | Dicks | Jan. 21, 1941 |
| 2,334,967 | Thomas et al. | Nov. 23, 1943 |
| 2,652,122 | Longfellow | Sept. 15, 1953 |